D. LARSON.
ALTERNATING CURRENT MOTOR CONTROL.
APPLICATION FILED AUG. 31, 1910.
1,081,681.
Patented Dec. 16, 1913.
2 SHEETS—SHEET 2.
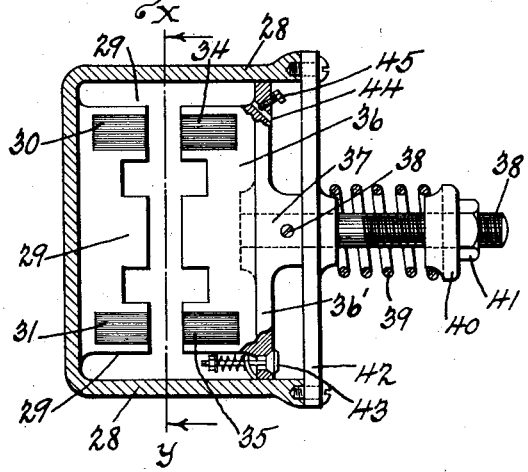
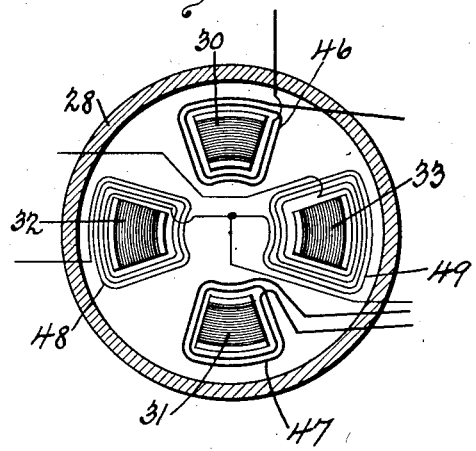
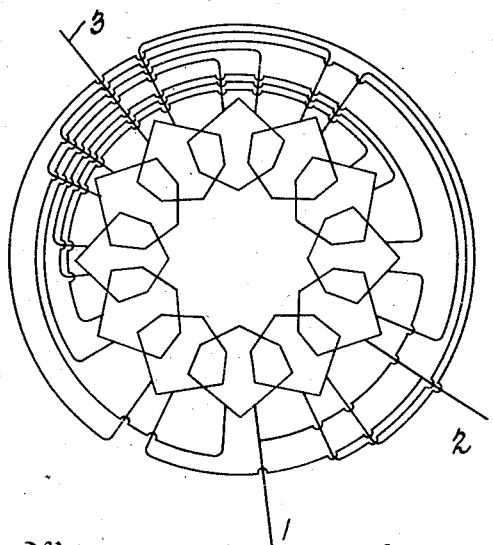
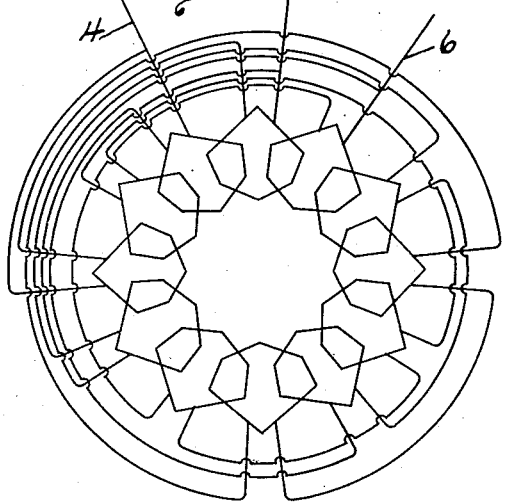
Witnesses:
James G. Bethell
Ernest L. Dale Jr.
Inventor
David Larson
By his Attorney
L. H. Campbell

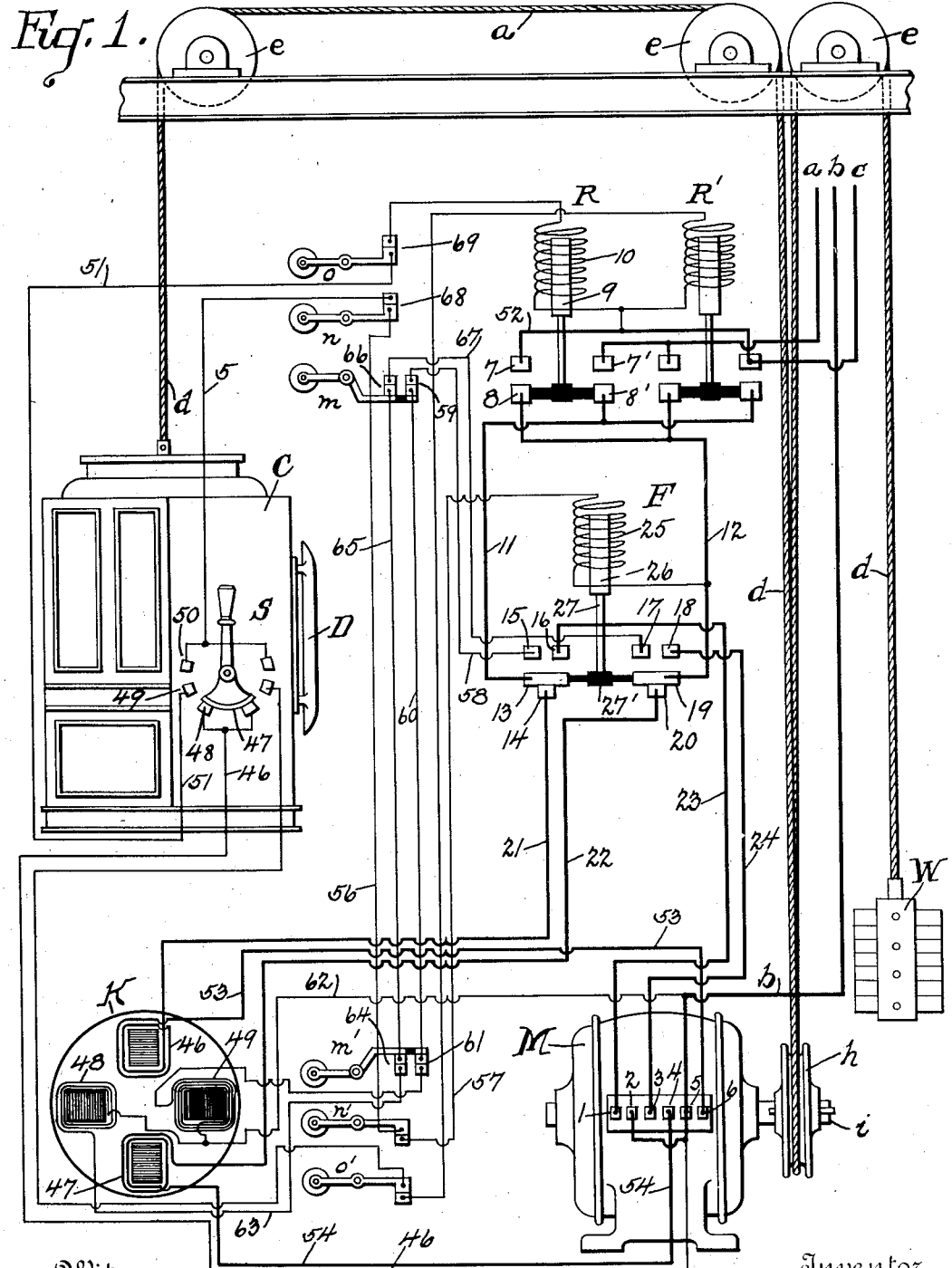

UNITED STATES PATENT OFFICE.

DAVID LARSON, OF YONKERS, NEW YORK, ASSIGNOR TO OTIS ELEVATOR COMPANY, OF JERSEY CITY, NEW JERSEY, A CORPORATION OF NEW JERSEY.

ALTERNATING-CURRENT-MOTOR CONTROL.

1,081,681. Specification of Letters Patent. Patented Dec. 16, 1913.

Application filed August 31, 1910. Serial No. 579,872.

*To all whom it may concern:*

Be it known that I, DAVID LARSON, a subject of the King of Sweden, residing at Yonkers, in the county of Westchester and State of New York, have invented a new and useful Improvement in Alternating-Current-Motor Control, of which the following is a specification.

My invention relates broadly to motor control, and more particularly to the control of alternating current motors for elevators or hoists.

One object of my invention is to give better control of electric motors than heretofore.

Another object is to increase the flexibility of the speed control of alternating current motors for elevator and hoisting service.

Further objects of my invention will hereinafter appear the novel features being pointed out in the appended claims.

My invention consists in means for carrying out the above objects, and it further consists in the apparatus having the general mode of operation, as hereinafter fully described and shown in the specification and drawings, in which—

Figure 1 is a diagrammatic representation of apparatus and electrical circuits associated therewith illustrating my invention; Fig. 2 is a view in part section of a choking device; Fig. 3 is an end sectional view of Fig. 2 on the line $x y$; Fig. 4 is a wiring diagram showing the windings and connections for four poles on the stator; Fig. 5 is a similar wiring diagram showing the windings and connections for eight poles on the stator; the stator windings of both Figs. 4 and 5 being delta connected.

Referring to the drawings, I have illustrated my invention by showing a motor in connection with an elevator or hoist, although I am not to be understood as limiting my invention to elevator apparatus, for my system of motor control may be used wherever it is applicable. In this instance the motor M is an induction motor having a grooved driving sheave $h$ secured to the motor shaft $i$. A hoisting cable $d$ is arranged in driving engagement with the sheave $h$ and leads up over suitable guide pulleys $e, e, e$, at the top of the hatchway and is connected at either end to an elevator car C and counterbalance weight W respectively. This arrangement of driving connections between the motor and the elevator car is merely typical and is chosen for its simplicity and clearness of illustration. The control of the motor M may be effected from the car by means of a switch S therein, or if desired the switch S may be located in any other convenient place.

D designates a cam carried by the car and arranged to engage limit switches $m$, $n$, $o$, and $m'$, $n'$, $o'$, located at or near the upper and lower limits respectively, of the car travel.

R and R' represent reversing switches for the motor. These switches are similar in construction and each comprises a magnet winding such as 10 which when energized raises a core 9 thereby moving a pair of contacts 8 and 8' into electrical engagement with another pair of fixed contacts 7 and 7', respectively.

F designates a speed controlling switch which comprises a magnet winding 25 and core 26. To the latter is connected a rod 27 at the lower end of which is an insulated piece 27' carrying contacts 13 and 19. These contacts are in electrical engagement with stationary contacts 14 and 20, respectively, when the core is in its lowermost position, but when the magnet winding 25 is energized to raise the core 26 the contacts 13 and 19 are raised out of engagement with the contacts 14 and 20 and into electrical engagement with other fixed contacts 15, 16 and 17, 18, respectively.

K designates a choking device the construction of which is illustrated in detail in Figs. 2 and 3. It comprises a fluid tight cylindrical casing 28 on the inside of which are arranged a number of laminated magnetic poles such as 30, 31, 32 and 33, held in place by a support 29 which may be formed integral with the casing 28 as here shown or made separate and secured thereto. Adjacent the laminated poles 30, 31, etc., are similar laminated poles 34, 35 which are carried by a movable supporting member 36, the right hand end 36' of which is machined so as to form a fluid tight piston having a sliding fit with the inside of the casing 28. A stem 38 is rigidly secured to the movable member 36 by a screw 38' or other suitable fastening means and passes through a cover 42 secured to the casing 28. This stem is threaded over a portion of its length and is surrounded by a stiff coil spring 39 which bears against the cover 42 and a screw threaded adjustable collar 40. 41 is a lock nut by means of which the collar 40 may be locked in its adjusted position with the spring under any desired tension. The piston 36' is provided with a spring pressed check valve 43 adapted normally to close a fluid passage through the piston and arranged to permit the piston and connected parts to move freely in a left hand direction but to check its movement in the opposite direction. A passage 44 is also provided in the piston, said passage being more or less restricted by means of an adjustable throttling plug 45.

The casing 28 is preferably filled with fluid such as oil, and the movement of the piston 36' therein is controlled by the combined action of the passage 44 and check valve 43. That is to say, if the piston is moved in a left hand direction the resistance offered by the fluid contained in the casing will be negligible or at least very slight since the check valve will open and the fluid may then pass freely from one side of the piston to the other, the restricted passage 44 affording an additional means for the transmission of fluid. If, however, the piston be moved in a right hand direction, the check valve 43 will not be moved off its seat and the retarding action of the fluid will depend upon the extent of throttling effected at the passage 44. Thus it is seen that the piston may move freely in one direction but is retarded in the opposite direction by an amount which may be adjusted at will. The fixed laminated pole pieces 30, 31, 32, 33 and adjacent movable pole pieces such as 34, 35, respectively are located at a short distance from each other and in horizontal alinement and each adjacent pair of fixed and movable pole pieces are surrounded by a winding such as 46, 47, 48 and 49, shown diagrammatically in Figs. 1 and 3. The coils surrounding the upper and lower pole pieces are composed of heavy wire since they carry the motor current, while the other coils 48 and 49 have a finer winding since they receive current directly from the main line and at a comparatively high voltage.

The apparatus illustrated in Figs. 2 and 3 I term a choking device since its function is to control the current flowing in the coils 46 and 47 and the motor by the variable choking action due to the extent of air gap between adjacent pole pieces. The heavy wire coils 46 and 47 carry the motor current but they are so arranged that they will not have sufficient magnetizing strength to move their cores together against the action of the coil spring 39. The coils 48 and 49 however will have sufficient magnetizing power to move the pole pieces together against the action of the spring 39, thereby varying the air gap between adjacent pole pieces and in this manner controlling the current flowing to the motor through the coils 46 and 47 by the well known action of choke coils in general.

In adapting an alternating current motor to elevator or general hoisting purposes, it is very desirable to vary its speed of rotation. For instance in the case of elevators it is particularly desirable to slow down the motor just previous to making a landing, and just before the motor is automatically stopped at the top and bottom limits of travel. While the benefits derived from a graduated stop are of minor importance in the case of general hoisting purposes when a dead load is raised or lowered, it becomes of the utmost importance in the case of passenger elevators, since abrupt speed changes produce discomforting effects and endanger the safety of the passengers as well as producing stresses and strains in the hoisting apparatus and cables. One method of controlling the speed of an alternating current motor is by changing the number of field poles according to the well known principle of operation of induction motors, whereby the speed of the motor may be reduced by increasing the number of field poles, and increased by reducing the number of poles. While there are other methods of controlling the speed of such a motor, I have assumed that its speed is varied by changing the number of field poles. Such being the case it is customary to start the motor at a slow rate of speed with the motor field windings connected and completed for a certain number of poles and then, after the motor has attained slow speed, change over the field connections so that the number of poles will be reduced and the speed of the motor thereby increased in proportion to the variation in the number of poles.

In Figs. 4 and 5 I have illustrated the windings and connections of an induction motor stator having four and eight poles respectively, but I am not to be understood as limiting myself to any particular number of poles or to particular variations in the number, having assumed the numbers given merely as illustrations of what may be accomplished according to my invention. It may be herein stated that the circuits of the rotor and its mechanical parts have not been indicated in the drawings, it being understood, of course, that the rotor may be of any suitable form for induction motors, as for instance, it may consist of a squirrel cage construction or winding comprising a rotating part.

My invention may be best understood by tracing out the various circuits and showing the operation in detail. Referring to Fig. 1 I will assume that the mains $a$, $b$ and $c$ are supplied with three-phase alternating current from some suitable source of electrical energy. The first operation is effected by moving the controlling lever of the switch S to the right or left. I will assume that it is moved to the right until the contact segment 47 bridges the fixed contacts 48 and 49. This operation completes a circuit to the reversing switch R which may be traced from the main b, conductor 46, contact 48, contact segment 47, contact 49, wire 51, contacts of limit switch o, to and through the magnet winding 10 of reversing switch R and to the main c by the wire 52. The winding 10 now being energized, it will raise the core 9 and connected contacts 8 and 8' upwardly, the latter coming into engagement with the fixed contacts 7 and 7, respectively. This operation completes a circuit to the motor and may be traced from the main a through the contacts 7' and 8', conductor 11, contacts 13 and 14 of the speed controlling switch F, wire 21, coil 46 of choking device K, and by wire 53 to the terminal 6 on the motor. The operation of the reversing switch also closes a circuit to the motor from the main c and may be traced through the wire 52, contacts 7 and 8, wire 12, contacts 19 and 20, wire 22, through the coil 47, and by the wire 54 to the motor terminal 4. The main b is shown connected directly to the motor terminal 5. Referring to Fig. 5 it will be seen that the motor terminals 4, 5 and 6 lead to the field windings which correspond to an eight pole connection. The motor therefore starts to rotate and quickly runs up to slow speed, the elevator car moving in an upward direction. The motor circuit from the mains a and c passes through the coils 46 and 47, respectively, but the choking action of the coils at this time has little or no effect upon the motor current since the air gap in the magnetic circuit of the choking device is at a maximum. The operator now moves the lever of switch S into its extreme right hand position with the contact segment 47 in electrical engagement with the contacts 48, 49 and 50. This operation closes a circuit through the magnet winding of switch F which may be traced as follows: from the main b by wire 46, controlling switch contact 50, wire 55, contacts of limit switch n, wire 56, contacts of limit switch n', wire 57, magnet winding 25 of the speed controlling switch F, wire 12, contacts 8 and 7, and by wire 52 to the main c. The magnet 25 is now energized to raise its core 26 and connected contacts 13 and 19, the latter moving out of engagement with the contacts 14 and 20, and into electrical engagement with the contacts 15, 16 and 17, 18, respectively. The motor circuit is momentarily interrupted at the contacts 14 and 20, but is almost immediately established again at the contacts 16 and 18. These contacts are connected by the wires 23 and 24 directly to the motor terminals 1 and 3, the terminal 2 being permanently connected to the main b. The motor now receives current with its field windings arranged for four poles (see Fig. 4) and therefore its rotor will accelerate to full running speed due to the reduction in the number of field poles as before pointed out. The operation of the switch F not only effected an increase in the speed of the motor but closed a circuit to the windings 48 and 49 of the choking device K. These windings may be arranged for three phase excitation with one terminal of each coil being connected by the wire 62 directly to the main b. The other terminal of the coil 48 is connected by the wire 63 through the contacts 64 of the limit switch m', wire 65, contacts 66 of limit switch m, wire 67, contacts 17 and 19, wire 12, contacts 8 and 7, and by wire 52 to the main c. The other terminal of the coil 49 is connected through the contacts 61 of the limit switch m', wire 60, contacts 59 of limit switch m, wire 58, contacts 15 and 13, wire 11, contacts 8' and 7' and to the main a. The coils 48 and 49 are now energized and will have sufficient magnetizing power to cause the movable pole pieces 34, 35, etc. (see Fig. 2) of the choking device K to approach the corresponding stationary pole pieces 30, 31, etc., the check valve 43 permitting the movable pole pieces quickly to reduce the air gap between adjacent poles in opposition to the spring 39. It will be noted that the action of the choking device K at this time does not have any effect on the motor since the coils 46 and 47, which were in circuit with the motor when it was being started and operated at slow speed, are no longer energized as their circuit was opened at the lower contacts of the switch F when its magnet winding was energized.

In order to reduce the speed of the motor, the operator moves the lever of controlling switch S toward center until the contact segment 47 moves out of electrical engagement with the contact 50. The circuit to the magnet winding 25 is thereby interrupted and the contacts 13 and 19 move out of engagement with the contacts 15, 16 and 17, 18 and into engagement with the contacts 14 and 20, respectively. This operation changes the motor connections so as to increase the number of field poles and decrease its speed, and at the same time interrupts the circuit through the coils 48 and 49 of the choking device K at the contacts 15 and 17. Although the circuit of the coils 48 and 49 is interrupted, the pole pieces 34, 35, etc., do not immediately move away from the adjacent stationary pole pieces 30, 31, etc., since the fluid contained in the casing of the choking device can only flow through the restricted passage 44 slowly. Since the motor circuit now includes the choking coils 46 and 47 and since the air gap in the magnetic circuit set up by the current in said coils is at a minimum, it follows that the current flowing to the motor at the time is choked or held in check and the result will be a smooth and easy reduction in motor speed without the usual violent fluctuation of current flow. As the spring 39 of the choking device gradually increases the air gap the choking action becomes less and less until finally the air gap is once more at a maximum and by this time the motor has gradually and gently fallen in speed until it has reached its normal slow speed running condition. In order to stop the motor, the lever of the controlling switch S is brought back to center thereby interrupting the circuit of the reversing switch magnet 10 at the contact 49 and permitting the reversing switch to cut off the supply of current to the motor and all parts come to rest. While it is customary to employ a brake apparatus in connection with hoisting machinery in order positively to stop the motor I have not illustrated or described such apparatus since it may be of the usual construction and forms no part of my invention.

The automatic stop at the top and bottom limits of car travel is effected by means of the cam D, on the car engaging either the limit switches $m$, $n$, $o$ or the limit switches, $m'$, $n'$ $o'$. In order to point out this operation, I will assume the lever of the controlling switch S to be in its extreme right hand position with the switch F in raised position and the motor running at full speed and the elevator car ascending. As the latter approaches its upper limit of travel the cam D engages the roller of switch $m$ which causes the switch contacts 66 and 59 to open. Since these contacts are included in the circuit which energizes the coils 48 and 49 of the choking device K, it follows that the latter becomes deënergized and permits the coil spring 39 to slowly move the pole pieces 34, 35, etc. in a right hand direction with a maximum air gap. This operation is a preparatory one since it does not vary or check the speed of the motor. As the car continues to ascend the roller of the limit switch $n$ is next engaged by the cam D and the contacts 68 become separated. Since these contacts are included in the circuit of the magnet winding of switch F, it follows that the latter will be deënergized and allow the core 26 and connected contacts 13, 19 to drop thereby interrupting the circuit through the high speed windings of the motor and connecting in circuit the low speed windings together with the choke coils 46 and 47. This operation will rapidly reduce the speed of the motor since the choke coils will not check the current to the motor, the choke coil air gap being at a maximum. As the elevator car continues to move upwardly at reduced speed the cam D engages the roller of the limit switch $o$. This will effect the opening of the contacts 69, thereby deënergizing the magnet winding 10 of the reversing switch R and the latter will operate to cut off all supply of current to the motor and all parts will come to rest. The operation of the hoisting apparatus with a descending car is similar in every respect to that already described. In this instance the lever of the controlling switch is moved in a left hand direction and as the car approaches its lower limit of travel the limit switches $m'$, $n'$ and $o'$ will operate successively to slow down and stop the car automatically at its lower limit of travel.

It will be seen that according to my invention an alternating current motor may be quickly brought up to full running speed and then gradually and gently slowed down and stopped at any desired point in the car travel with the exception of the automatic stop at the extreme top and bottom limits of travel. While the system shown and described could readily be changed so as to produce a gentle slow down at the limits of travel I prefer an arrangement as shown for the reason that the automatic slow down and stop at the limits is seldom called into action and is of the nature of a precautionary or safety device and only operates when the elevator attendant neglects to stop the car at the upper or lower landings. For this reason the system shown permits an abrupt slow down at the limits but effects a gentle and smooth slow down at all other points in the car travel.

Because of the fact that in stopping the motor it is reduced from a high speed to a slow speed and allowed to operate at said slow speed for an appreciable time before being stopped, an elevator car connected to be operated by the motor may be more readily controlled and stopped more exactly at its desired landing without inconvenience to the passengers or derangement to the hoisting machinery.

From the descriptions of apparatus and the operation thereof herein given I am not to be understood as limiting myself to the apparatus shown and described for carrying out my invention. I have illustrated and described suitable apparatus, circuits, and connections for carrying out my broad invention, and it is obvious to those skilled in the art that many different arrangements of circuits and connections and electromagnetic controlling apparatus may be devised for accomplishing the ends I have in view. Obviously, also, my invention is applicable to different uses, and some features of my invention may be used without others, and each separate feature may be used alone if desired. For these reasons and without attempting to enumerate equivalents, therefore,

I claim, and desire to secure by Letters Patent of the United States the following:—

1. The combination of an alternating current motor, mechanism for starting and stopping the same, and electroresponsive means controlled by said mechanism automatically to oppose a sudden reduction in the speed of the motor.

2. The combination of an alternating current motor, electromagnetically controlled means for changing the speed of the same by changing the number of field poles of the motor, and means to automatically offer a gradually diminished opposition to the said change in the speed.

3. The combination with an alternating current motor, of inductive apparatus for automatically controlling the current to said motor, and means for retarding the action of said apparatus.

4. The combination with an alternating current motor, of inductive apparatus for automatically controlling the current to said motor, and fluid controlled mechanism for controlling the operation of said inductive apparatus.

5. The combination with an alternating current motor, of means for changing the number of field poles of said motor to vary the speed thereof, and means for controlling the current to said motor and automatically preventing a sudden change in the speed of the motor when the number of field poles is changed.

6. The combination with an alternating curent motor, of means for changing the number of field poles of said motor to vary the speed thereof, and inductive apparatus for controlling the current to said motor and automatically effecting a gradual reduction in the speed of the motor.

7. The combination with an alternating current motor, of means for changing the number of field poles of said motor to vary the speed thereof, and fluid controlled inductive apparatus for controlling the current to said motor.

8. The combination with an alternating current motor, of inductive speed controlling means therefor, and retarding mechanism associated with said speed controlling means, and automatically operable during the slowing down only of the motor, substantially as described.

9. The combination with an alternating current motor, of means for changing the speed of the same from fast to slow and from slow to fast during its operation, and inductive mechanism to cause a gradual change in the speed from fast to slow, substantially as described.

10. The combination with an alternating current motor, of means for starting, stopping and reversing the same, and automatically controlled means to temporarily reduce the current in the motor and change its circuits for varying the speed of the motor from fast to slow.

11. The combination with an alternating current induction motor, of means for starting, stopping and reversing the same, means for changing the path of the current through the motor for changing its speed from slow to fast on starting, and means for temporarily choking the current flow and thereby gradually changing back to slow speed before stopping.

12. The combination of an alternating current motor, of a choke coil in a circuit of the motor, and substantially ineffective during the acceleration of the motor, and automatic means for gradually increasing the inductive effect of said choke coil during the slowing down of the motor.

13. The combination with an alternating current motor, of a controller therefor, a choke coil in the circuit of said motor and controlled by said controller, means for controlling the inductive effect of said choke coil, and means for retarding the action of said controlling means.

14. The combination with an alternating current motor, of a slow and fast speed winding associated with the same, a switch adapted to control a circuit to said windings, an inductive device for preventing a sudden reduction in the speed of the motor by controlling the flow of current through one of said windings, and means for automatically retarding the action of said inductive device.

15. The combination with an alternating current motor, of a slow and fast speed winding associated with said motor, a switch adapted to control a circuit to said windings, an inductive device for automatically preventing a sudden decrease in the speed of the motor by controlling the flow of current through the slow speed winding of the motor, and means comprising a fluid dashpot for retarding the action of said inductive device.

16. The combination with an alternating current motor of means for changing the motor circuits to effect changes in the speed of the motor, a choking device arranged to control the current flow to said motor and oppose a sudden reduction in the motor speed, electro-magnetic means for effecting a movement of said device in one direction to a position of maximum choking effect, means for moving said device in the opposite direction into a position of minimum choking effect, and means for retarding said last named movement.

17. In an elevator the combination with a car, an alternating current motor connected to operate the same, fast and slow speed windings for the motor, a switch in the car for controlling a circuit to said windings, and inductive means automatically to prevent a sudden heavy flow of current in one of said windings.

18. In an elevator, the combination with a car, an alternating current motor connected to operate the same, fast and slow speed windings for the motor, a switch in the car for controlling a circuit to said windings, and inductive means for varying the current in one of said windings and thereby preventing a sudden change from a fast to a slow speed of the motor.

19. In an elevator, the combination with a car, of an alternating current motor operatively connected thereto, means for increasing the speed of the car from slow to fast, and inductive means automatically to prevent a sudden decrease in the speed from fast to slow, substantially as described.

20. In an elevator, the combination with a car, of an alternating current motor operatively connected thereto, means for inductively controlling the current supply to the motor and thereby gradually reducing the speed of the car before stopping, and means operated by the car for effecting a quick reduction in speed.

21. In an elevator, the combination with an alternating current motor, of a car operatively connected thereto, means operated by the car for effecting a quick slow down at the limits of car travel, and inductive means arranged to prevent a sudden heavy flow of current through the motor and thereby effect a gradual slow down at intermediate points.

22. In an elevator, the combination with a car, of an alternating current motor operatively connected thereto, fast and slow speed windings on said motor, a switch in the car for effecting the energization of one or the other of said windings, means for controlling the current to said motor when slow speed winding is energized to reduce the speed of the motor, and means operated by the car for rendering said controlling means inoperative.

23. In an elevator, the combination with a car, of an alternating current motor operatively connected thereto, fast and slow speed windings on said motor, a switch for controlling a circuit to said windings, and means for automatically varying the current in one of said windings when the said switch is operated, and thereby preventing a sudden reduction in the motor speed.

24. The combination of an alternating current motor, fast and slow speed windings therefor, means for changing the circuit connections from the fast to the slow speed windings, an impedance in the slow speed circuit, and automatic means to gradually reduce said impedance when the slow speed windings are connected in circuit during the slowing down of the motor.

25. The combination of an alternating current motor, means to change the motor circuits and thereby reduce the speed of the motor, and electro-responsive mechanism to modify in a gradually diminishing degree the reduction in speed due to said change in the motor circuits.

In testimony whereof, I have signed my name to this specification in the presence of two subscribing witnesses.

DAVID LARSON.

Witnesses:
FREDK. THOMPSON,
CLARENCE BROADHURST.